(12) United States Patent
Sloane et al.

(10) Patent No.: US 11,588,849 B2
(45) Date of Patent: Feb. 21, 2023

(54) SYSTEM FOR PROVIDING ENHANCED CRYPTOGRAPHY BASED RESPONSE MECHANISM FOR MALICIOUS ATTACKS

(71) Applicant: BANK OF AMERICA CORPORATION, Charlotte, NC (US)

(72) Inventors: Brandon Sloane, Indian Land, SC (US); Regina Yee Cadavid, San Gabriel, CA (US); Gloria Joo, Moorpark, CA (US); Jinyoung Nathan Kim, Charlotte, NC (US); Ram Korlepara, McKinney, TX (US); Elliott Leonard Lillard, Denver, CO (US); Nia Mack, Addison, TX (US); Philip Lone Mintac, Charlotte, NC (US); Michael Jacob Richardson, Chicago, IL (US); Srilekha Mudumbai Srinivasa, Murphy, TX (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 122 days.

(21) Appl. No.: 17/159,938

(22) Filed: Jan. 27, 2021

(65) Prior Publication Data
US 2022/0239669 A1   Jul. 28, 2022

(51) Int. Cl.
H04L 9/08 (2006.01)
H04L 9/40 (2022.01)

(52) U.S. Cl.
CPC .......... *H04L 63/145* (2013.01); *H04L 9/0869* (2013.01); *H04L 9/0894* (2013.01)

(58) Field of Classification Search
CPC ... H04L 63/14; H04L 63/145; H04L 63/1408; H04L 63/1416; H04L 63/1425; H04L 63/1433; H04L 63/1441; H04L 63/04; H04L 63/0482; H04L 9/08; H04L 9/0869; H04L 9/0894
See application file for complete search history.

(56) References Cited

U.S. PATENT DOCUMENTS

| | | |
|---|---|---|
| 9,317,686 B1 | 4/2016 | Ye et al. |
| 9,774,601 B2 | 9/2017 | Niemela et al. |
| 10,469,525 B2 | 11/2019 | Hittel et al. |
| 10,554,688 B1* | 2/2020 | Wueest ............... H04L 63/1416 |
| 10,609,066 B1* | 3/2020 | Nossik ............... H04L 63/1408 |
| 10,650,154 B2 | 5/2020 | Ray et al. |
| 10,666,681 B2 | 5/2020 | Adams et al. |
| 10,681,078 B2 | 6/2020 | Humphries et al. |
| 10,791,097 B2 | 9/2020 | Ortner et al. |
| 10,963,564 B2 | 3/2021 | Chelarescu et al. |

(Continued)

*Primary Examiner* — Shaqueal D Wade-Wright
(74) *Attorney, Agent, or Firm* — Moore & Van Allen PLLC; Nicholas C. Russell

(57) ABSTRACT

Embodiments of the present invention provide a system for providing enhanced cryptography based response mechanism for malicious attacks. The system is configured for generating one or more tracker seeds, storing the one or more tracker seeds in at least one entity system associated with an entity, identifying a malicious event associated with data in the at least one entity system, in response to identifying the malicious event, identifying an encryption algorithm key pair for the malicious event based on the one or more tracker seeds, and decrypting the data in the at least one entity system based on the encryption algorithm key pair.

20 Claims, 5 Drawing Sheets

(56) References Cited

U.S. PATENT DOCUMENTS

| | | | |
|---|---|---|---|
| 11,089,056 B2* | 8/2021 | Schütz | G06F 21/554 |
| 2001/0054157 A1 | 12/2001 | Fukumoto | |
| 2006/0075481 A1 | 4/2006 | Ross et al. | |
| 2008/0016570 A1 | 1/2008 | Capalik | |
| 2008/0046997 A1 | 2/2008 | Wang | |
| 2008/0047013 A1 | 2/2008 | Claudatos et al. | |
| 2009/0144823 A1 | 6/2009 | Lamastra et al. | |
| 2011/0264906 A1 | 10/2011 | Pourzandi et al. | |
| 2016/0164894 A1 | 6/2016 | Zeitlin et al. | |
| 2016/0323316 A1 | 11/2016 | Kolton et al. | |
| 2017/0308711 A1 | 10/2017 | Barak | |
| 2018/0139053 A1 | 5/2018 | Kadam et al. | |
| 2019/0235899 A1* | 8/2019 | Samprathi | G06F 9/455 |
| 2020/0082084 A1* | 3/2020 | Kallos | G06F 21/6218 |
| 2020/0412740 A1 | 12/2020 | Goutal et al. | |
| 2021/0026961 A1* | 1/2021 | Underwood | G06F 16/9027 |

* cited by examiner

SYSTEM FOR PROVIDING ENHANCED CRYPTOGRAPHY BASED RESPONSE MECHANISM FOR MALICIOUS ATTACKS

BACKGROUND

Conventional systems do not have the ability to provide a quick response for malicious events. As such, there exists a need for a system to provide enhanced response mechanism for malicious attacks.

BRIEF SUMMARY

The following presents a summary of certain embodiments of the invention. This summary is not intended to identify key or critical elements of all embodiments nor delineate the scope of any or all embodiments. Its sole purpose is to present certain concepts and elements of one or more embodiments in a summary form as a prelude to the more detailed description that follows.

Embodiments of the present invention address the above needs and/or achieve other advantages by providing apparatuses (e.g., a system, computer program product and/or other devices) and methods for providing enhanced cryptography based response mechanism for malicious attacks. The system embodiments may comprise one or more memory devices having computer readable program code stored thereon, a communication device, and one or more processing devices operatively coupled to the one or more memory devices, wherein the one or more processing devices are configured to execute the computer readable program code to carry out the invention. In computer program product embodiments of the invention, the computer program product comprises at least one non-transitory computer readable medium comprising computer readable instructions for carrying out the invention. Computer implemented method embodiments of the invention may comprise providing a computing system comprising a computer processing device and a non-transitory computer readable medium, where the computer readable medium comprises configured computer program instruction code, such that when said instruction code is operated by said computer processing device, said computer processing device performs certain operations to carry out the invention.

In some embodiments, the present invention generates one or more tracker seeds, stores the one or more tracker seeds in at least one entity system associated with an entity, identifies a malicious event associated with data in the at least one entity system, in response to identifying the malicious event, identifies an encryption algorithm and a key for the malicious event based on the one or more tracker seeds, and decrypts the data in the at least one entity system based on the encryption algorithm key pair.

In some embodiments, the present invention generates one or more encryption algorithm key pairs for the one or more tracker seeds and stores the one or more encryption algorithm key pairs in one or more rainbow tables.

In some embodiments, generating the one or more encryption algorithm key pairs further comprises encrypting the one or more tracker seeds using each of the one or more encryption algorithm key pairs and storing encrypted tracker seeds for each of the one or more encryption algorithm key pairs.

In some embodiments, identifying the encryption algorithm comprises identifying a match for encrypted data associated with the data after occurrence of the malicious data in the one or more rainbow tables and extracting an encryption algorithm key pair from the one or more encryption algorithm key pairs associated with the match.

In some embodiments, the present invention presents the one or more rainbow tables to one or more third party entities via a user platform.

In some embodiments, the user platform is a cloud based platform In some embodiments, the present invention In some embodiments, the present invention modifies the one or more rainbow tables based on input received from one or more third party entities.

In some embodiments, the malicious event is a ransomware attack.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
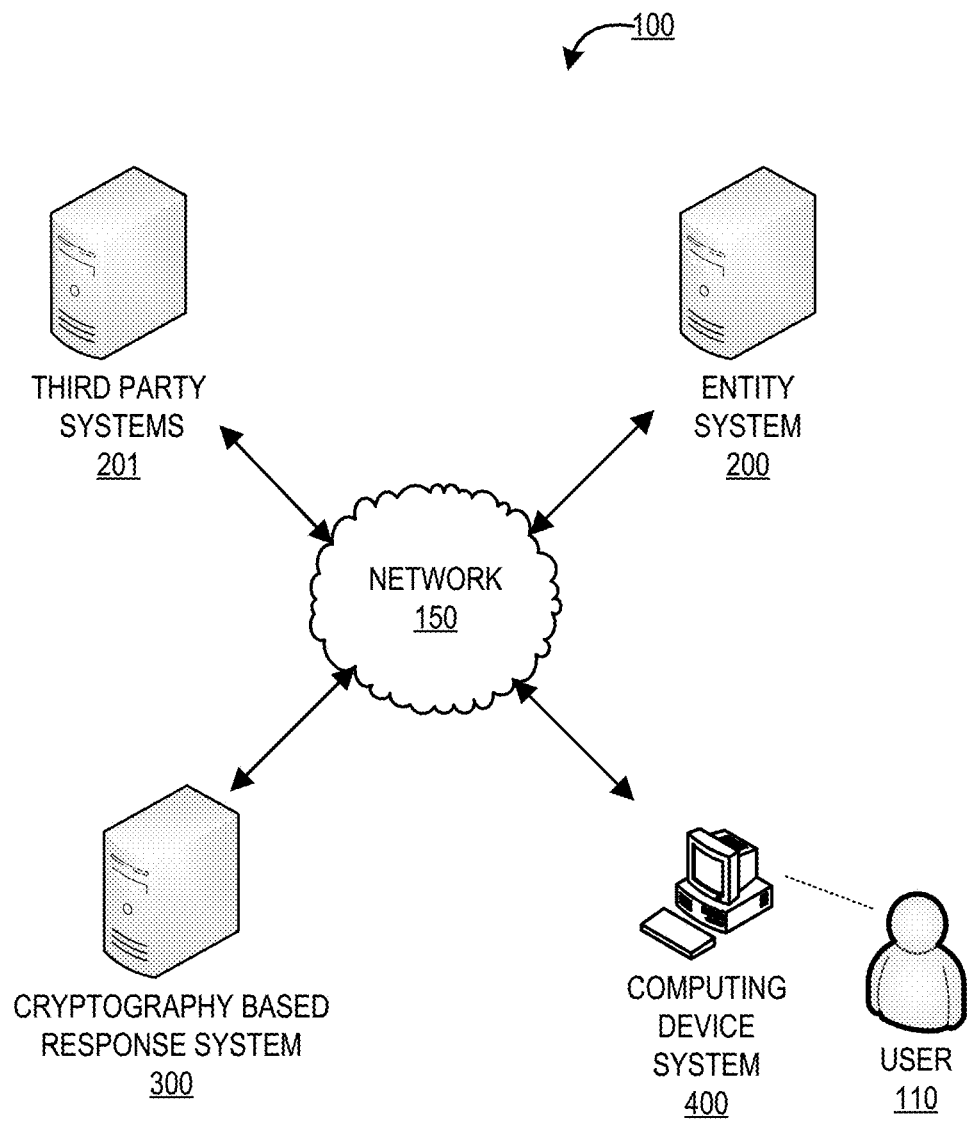
Figure 2:
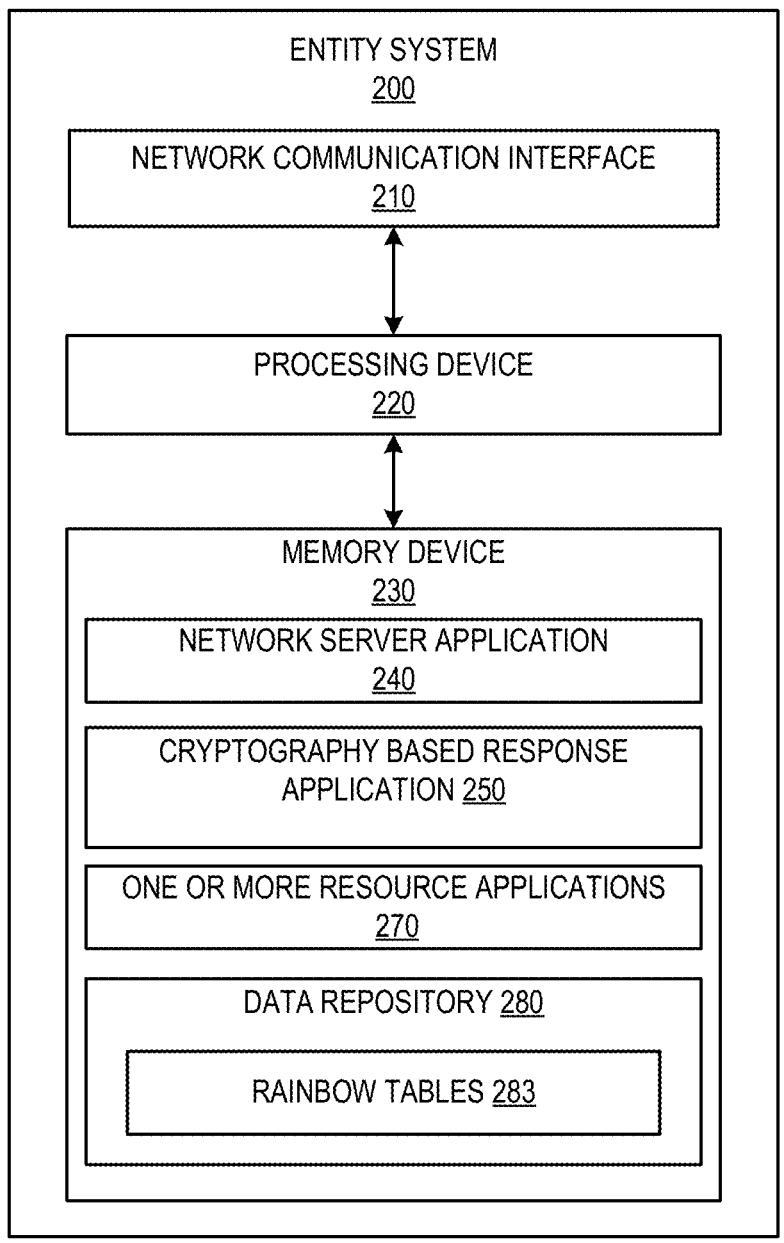
Figure 3:
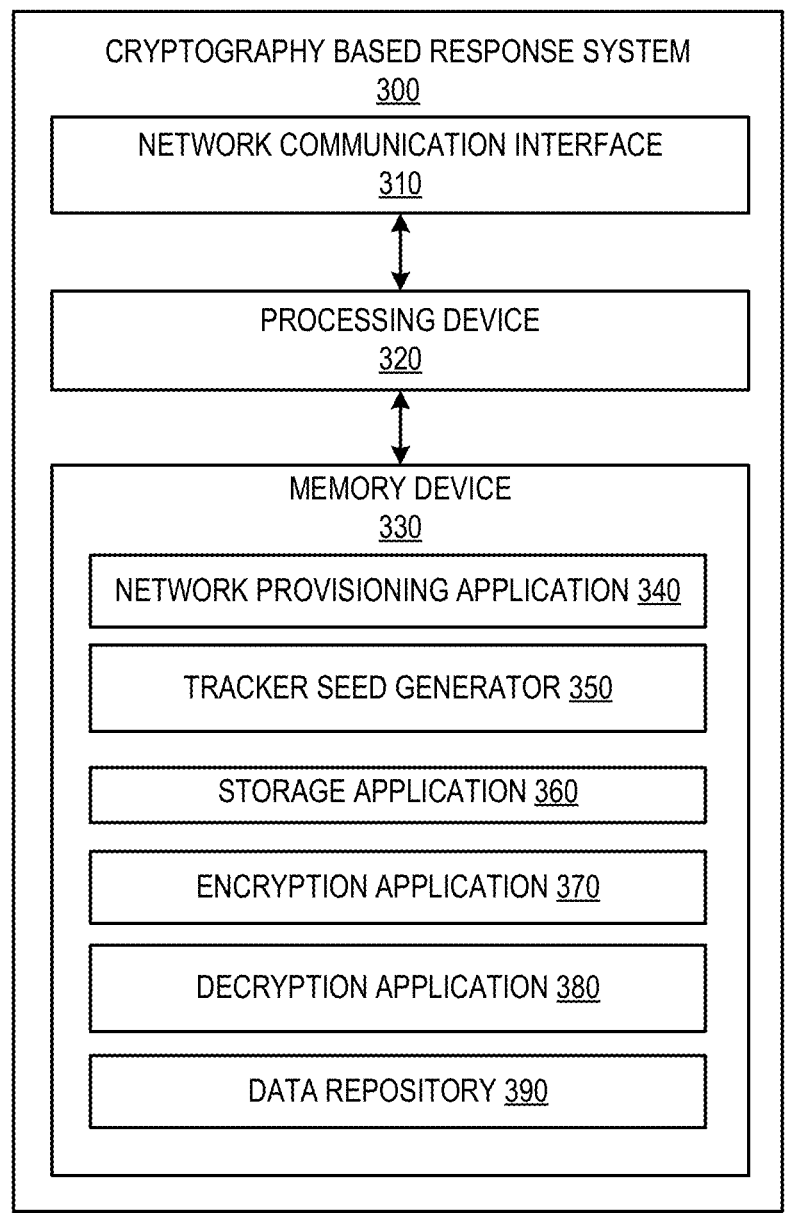
Figure 4:
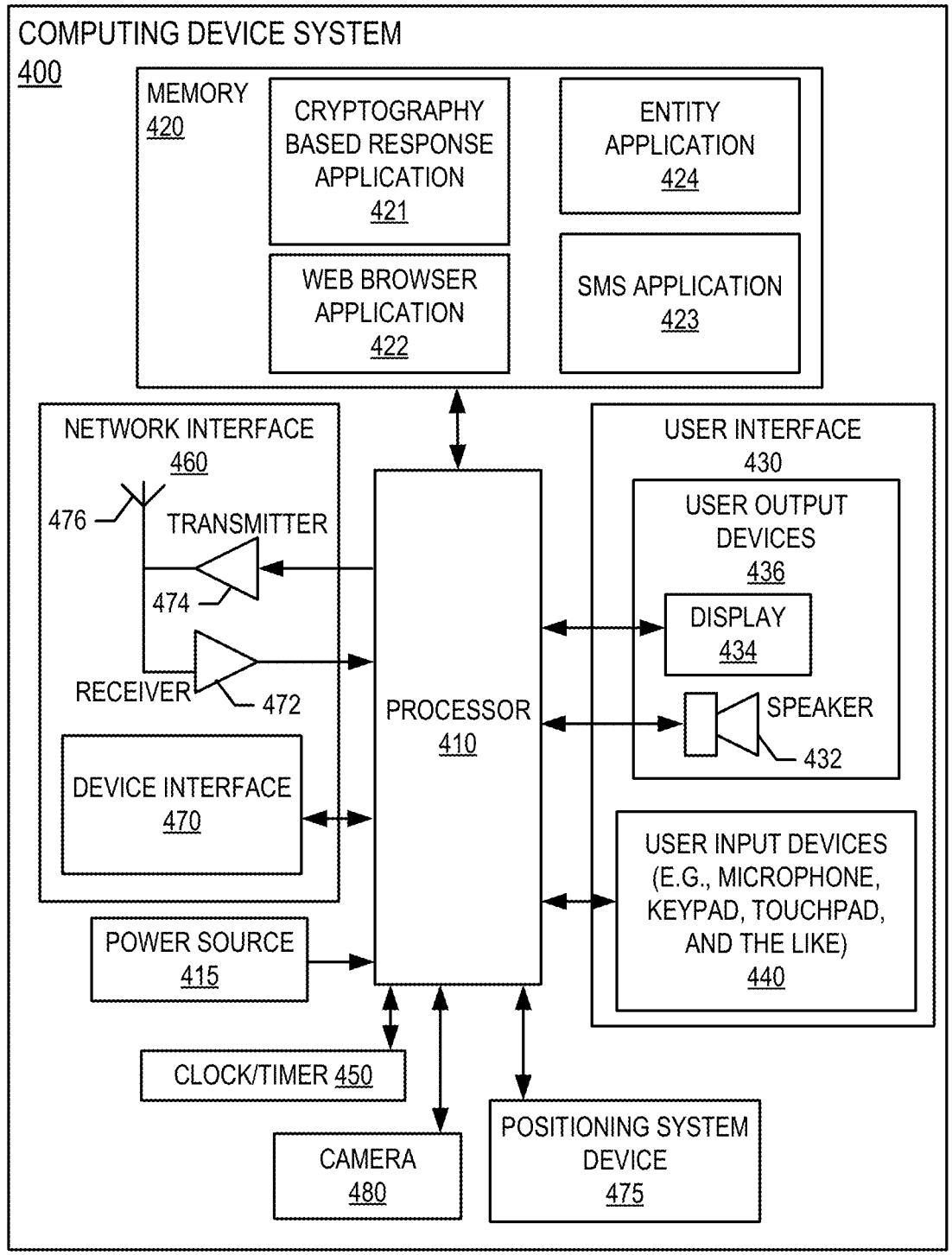
Figure 5:
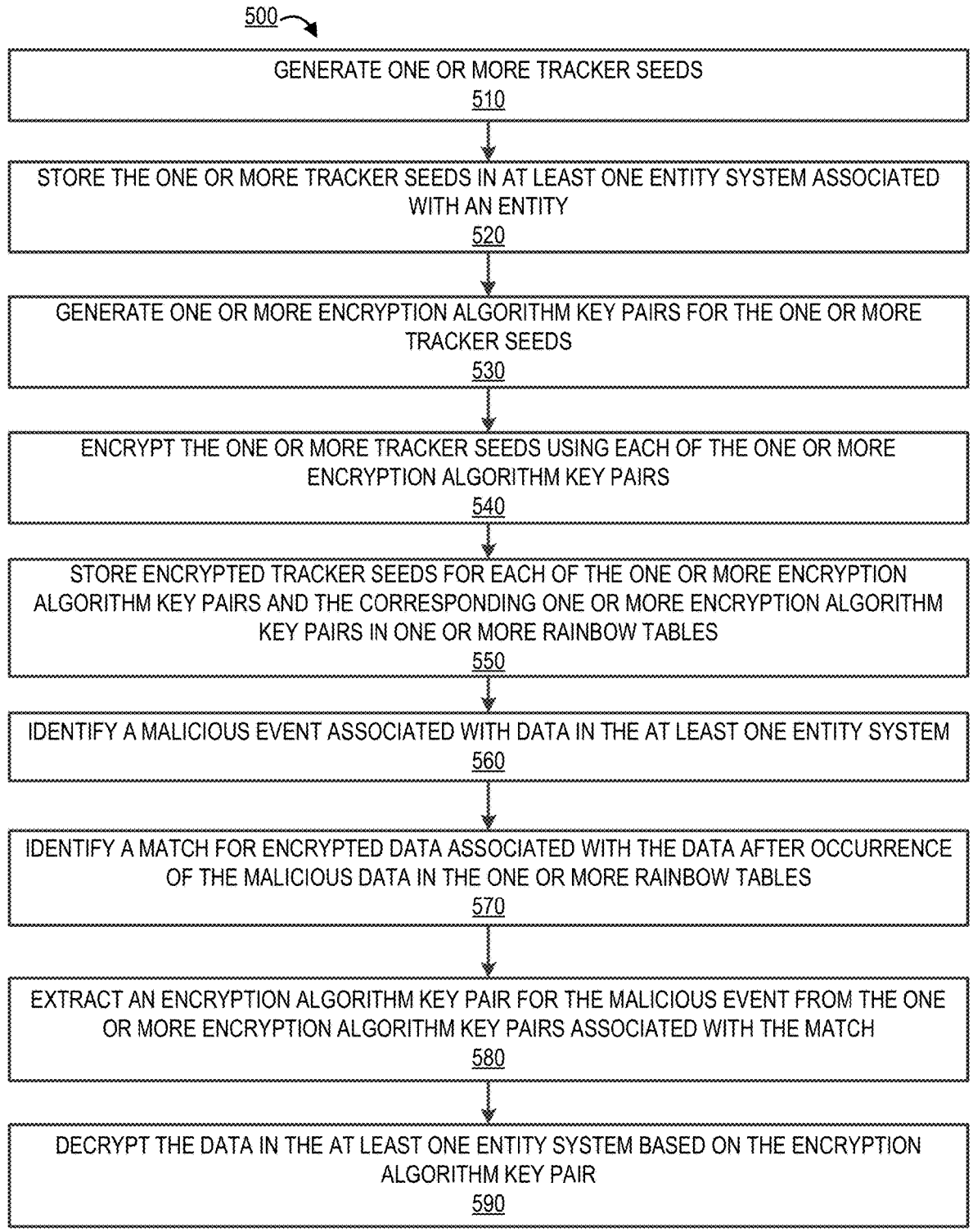

Having thus described embodiments of the invention in general terms, reference will now be made the accompanying drawings, wherein:

FIG. 1 provides a block diagram illustrating a system environment for providing enhanced cryptography based response mechanism for malicious attacks, in accordance with an embodiment of the invention;

FIG. 2 provides a block diagram illustrating the entity system 200 of FIG. 1, in accordance with an embodiment of the invention;

FIG. 3 provides a block diagram illustrating a cryptography based response system 300 of FIG. 1, in accordance with an embodiment of the invention;

FIG. 4 provides a block diagram illustrating the computing device system 400 of FIG. 1, in accordance with an embodiment of the invention; and FIG. 5 provides a flowchart illustrating a process flow for providing enhanced cryptography based response mechanism for malicious attacks, in accordance with an embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

In accordance with embodiments of the invention, the term "entity" may include any organization that processes financial transactions including, but not limited to, banks, credit unions, savings and loan associations, investment companies, stock brokerages, insurance companies and the like. In some embodiments, the term "entity" may include In accordance with embodiments of the invention, the terms "third party system" and "other third party systems" may include any organizations including, but not limited to, security software providers, other financial institutions, other non-financial institutions, and/or the like who may be prone to malicious attacks. Furthermore, embodiments of the present invention use the term "user." The term "user" may represent an employee of the entity or the third party entity.

In accordance with embodiments of the invention, a "malicious attack" or a "malicious event" may be a security attack that is performed by an unauthorized user (e.g., bad actor) on data or systems associated with the entity. In some embodiments of the present invention, the malicious event may be a ransomware attack.

Many of the example embodiments and implementations described herein contemplate interactions engaged in by a user with a computing device and/or one or more communication devices and/or secondary communication devices. A "user", as referenced herein, may refer to an entity or individual that has the ability and/or authorization to access and use one or more resources or portions of a resource. Furthermore, as used herein, the term "user computing device" or "mobile device" may refer to mobile phones, computing devices, tablet computers, wearable devices, smart devices and/or any portable electronic device capable of receiving and/or storing data therein.

A "user interface" is any device or software that allows a user to input information, such as commands or data, into a device, or that allows the device to output information to the user. For example, the user interface include a graphical user interface (GUI) or an interface to input computer-executable instructions that direct a processing device to carry out specific functions. The user interface typically employs certain input and output devices to input data received from a user second user or output data to a user. These input and output devices may include a display, mouse, keyboard, button, touchpad, touch screen, microphone, speaker, LED, light, joystick, switch, buzzer, bell, and/or other user input/output device for communicating with one or more users.

A "system environment", as used herein, may refer to any information technology platform of an enterprise (e.g., a national or multi-national corporation) and may include a multitude of servers, machines, mainframes, personal computers, network devices, front and back end systems, database system and/or the like.

FIG. 1 provides a block diagram illustrating a system environment 100 for providing enhanced cryptography based response mechanism for malicious attacks, in accordance with an embodiment of the invention. As illustrated in FIG. 1, the environment 100 includes a cryptography based response system 300, entity system 200, a computing device system 400, and third party systems 201. One or more users 110 may be included in the system environment 100, where the users 110 interact with the other entities of the system environment 100 via a user interface of the computing device system 400. In some embodiments, the one or more user(s) 110 of the system environment 100 may be employees of an entity associated with the entity system 200. In some other embodiments, the one or more users 110 may be employees of third parties associated with the third party systems 201.

The entity system(s) 200 may be any system owned or otherwise controlled by an entity to support or perform one or more process steps described herein. In some embodiments, the managing entity is a financial institution. In some embodiments, the managing entity may be a non-financial institution. In some embodiments, the entity system 200 may include one or more servers.

Third party systems 201 may be any systems that provide any information related to malicious events to the entity system 200. In some embodiments, the third party systems 201 may be any systems associated with third parties that have partnered with the entity. In some embodiments, the third party systems 201 may be any systems that consume information related to malicious events from the entity system 200.

The cryptography based response system 300 is a system of the present invention for performing one or more process steps described herein. In some embodiments, the cryptography based response system 300 may be an independent system. In some embodiments, the cryptography based response system 300 may be a part of the entity system 200.

The cryptography based response system 300, the entity system 200, the computing device system 400, and/or the third party systems 201 may be in network communication across the system environment 100 through the network 150. The network 150 may include a local area network (LAN), a wide area network (WAN), and/or a global area network (GAN). The network 150 may provide for wireline, wireless, or a combination of wireline and wireless communication between devices in the network. In one embodiment, the network 150 includes the Internet. In general, the cryptography based response system 300 is configured to communicate information or instructions with the entity system 200, the computing device system 400, and/or the third party systems 201 across the network 150.

The computing device system 400 may be a system owned or controlled by the entity of the entity system 200, the user 110, and/or a third party. As such, the computing device system 400 may be a computing device of the user 110. In general, the computing device system 400 communicates with the user 110 via a user interface of the computing device system 400, and in turn is configured to communicate information or instructions with the cryptography based response system 300, entity system 200, and/or the third party systems 201 across the network 150.

FIG. 2 provides a block diagram illustrating the entity system 200, in greater detail, in accordance with embodiments of the invention. As illustrated in FIG. 2, in one embodiment of the invention, the entity system 200 includes one or more processing devices 220 operatively coupled to a network communication interface 210 and a memory device 230. In certain embodiments, the entity system 200 is operated by a first entity, such as a financial institution, while in other embodiments, the entity system 200 is operated by an entity other than a financial institution.

It should be understood that the memory device 230 may include one or more databases or other data structures/repositories. The memory device 230 also includes computer-executable program code that instructs the processing device 220 to operate the network communication interface 210 to perform certain communication functions of the entity system 200 described herein. For example, in one embodiment of the entity system 200, the memory device 230 includes, but is not limited to, a cryptography based response application 250, one or more resource applications 270, and a data repository 280 comprising rainbow tables 283. The rainbow tables 283 comprise data that is stored by the cryptography based response system 300, where the data may comprise encryption algorithm key pairs and corresponding encrypted data of one or more tracker seeds that are encrypted using the encryption algorithm key pairs. The computer-executable program code of the network server application 240, the cryptography based response application 250, the one or more resource applications 270, to perform certain logic, data-extraction, and data-storing functions of the entity system 200 described herein, as well as communication functions of the entity system 200.

The network server application 240, the cryptography based response application 250, the one or more resource applications 270, are configured to store data in the data repository 280 or to use the data stored in the data repository 280 when communicating through the network communication interface 210 with the cryptography based response system 300, the computing device system 400, and/or the third party systems 201 to perform one or more process steps described herein. In some embodiments, the entity system 200 may receive instructions from the cryptography based response system 300 via the cryptography based response application 250 to perform certain operations. The cryptography based response application 250 may be provided by the cryptography based response system 300. The one or more resource applications 270 may be any of the applications used, created, modified, and/or managed by the entity system 200.

FIG. 3 provides a block diagram illustrating the cryptography based response system 300 in greater detail, in accordance with embodiments of the invention. As illustrated in FIG. 3, in one embodiment of the invention, the cryptography based response system 300 includes one or more processing devices 320 operatively coupled to a network communication interface 310 and a memory device 330. In certain embodiments, the cryptography based response system 300 is operated by a first entity, such as a financial institution, while in other embodiments, the cryptography based response system 300 is operated by an entity other than a financial institution. In some embodiments, the cryptography based response system 300 is owned or operated by the entity of the entity system 200. In some embodiments, the cryptography based response system 300 may be an independent system. In alternate embodiments, the cryptography based response system 300 may be a part of the entity system 200.

It should be understood that the memory device 330 may include one or more databases or other data structures/repositories. The memory device 330 also includes computer-executable program code that instructs the processing device 320 to operate the network communication interface 310 to perform certain communication functions of the cryptography based response system 300 described herein. For example, in one embodiment of the cryptography based response system 300, the memory device 330 includes, but is not limited to, a network provisioning application 340, a tracker seed generator 350, a storage application 360, an encryption application 370, a decryption application 380, and a data repository 390 comprising data processed or accessed by one or more applications in the memory device 330. The computer-executable program code of the network provisioning application 340, the tracker seed generator 350, the storage application 360, the encryption application 370, and the decryption application 380, may instruct the processing device 320 to perform certain logic, data-processing, and data-storing functions of the cryptography based response system 300 described herein, as well as communication functions of the cryptography based response system 300. In some embodiments, the memory device 330 of the cryptography based response system 300 comprises an artificial intelligence engine/machine learning model that dynamically generates the one or more rainbow tables based on input received from the third party entities. For example, the system may receive an encryption algorithm key pair from a third party entity which was successful in solving a malicious event and the machine learning module may dynamically update the one or more rainbow tables with new encryption algorithm key pairs that are generated based on the encryption algorithm key pair received from the third party entity. The cryptography based response system 300 allows the one or more third party entities and the entity associated with the present invention to exchange information associated with one or more malicious events and/or one or more rainbow tables via a platform, where the platform may be a cloud based platform.

The network provisioning application 340, the tracker seed generator 350, the storage application 360, the encryption application 370, and the decryption application 380 are configured to invoke or use the data in the data repository 390 when communicating through the network communication interface 310 with the entity system 200, the computing device system 400, and/or the third party systems 201. In some embodiments, the network provisioning application 340, the tracker seed generator 350, the storage application 360, the encryption application 370, and the decryption application 380 may store the data extracted or received from the entity system 200, the third party system 201, and the computing device system 400 in the data repository 390. The data repository 390 may comprise at least one or more rainbow tables, where the one or more rainbow tables may also be stored in the entity system 200, where the cryptography based response system 300 transmits the one or more rainbow tables to the entity system 200 via the cryptography based response application 250. In some embodiments, the network provisioning application 340, the tracker seed generator 350, the storage application 360, the encryption application 370, and the decryption application 380 may be a part of a single application.

FIG. 4 provides a block diagram illustrating a computing device system 400 of FIG. 1 in more detail, in accordance with embodiments of the invention. However, it should be understood that a mobile telephone is merely illustrative of one type of computing device system 400 that may benefit from, employ, or otherwise be involved with embodiments of the present invention and, therefore, should not be taken to limit the scope of embodiments of the present invention. Other types of computing devices may include portable digital assistants (PDAs), pagers, mobile televisions, entertainment devices, desktop computers, workstations, laptop computers, cameras, video recorders, audio/video player, radio, GPS devices, wearable devices, Internet-of-things devices, augmented reality devices, virtual reality devices, automated teller machine devices, electronic kiosk devices, or any combination of the aforementioned.

Some embodiments of the computing device system 400 include a processor 410 communicably coupled to such devices as a memory 420, user output devices 436, user input devices 440, a network interface 460, a power source 415, a clock or other timer 450, a camera 480, and a positioning system device 475. The processor 410, and other processors described herein, generally include circuitry for implementing communication and/or logic functions of the computing device system 400. For example, the processor 410 may include a digital signal processor device, a microprocessor device, and various analog to digital converters, digital to analog converters, and/or other support circuits. Control and signal processing functions of the computing device system 400 are allocated between these devices according to their respective capabilities. The processor 410 thus may also include the functionality to encode and interleave messages and data prior to modulation and transmission. The processor 410 can additionally include an internal data modem. Further, the processor 410 may include functionality to operate one or more software programs, which may be stored in the memory 420. For example, the processor 410 may be capable of operating a connectivity program, such as a web browser application 422. The web browser application 422 may then allow the computing device system 400 to transmit and receive web content, such as, for example, location-based content and/or other web page content, according to a Wireless Application Protocol (WAP), Hypertext Transfer Protocol (HTTP), and/or the like.

The processor 410 is configured to use the network interface 460 to communicate with one or more other devices on the network 150. In this regard, the network interface 460 includes an antenna 476 operatively coupled to a transmitter 474 and a receiver 472 (together a "transceiver"). The processor 410 is configured to provide signals to and receive signals from the transmitter 474 and receiver 472, respectively. The signals may include signaling information in accordance with the air interface standard of the applicable cellular system of the wireless network 152. In this regard, the computing device system 400 may be configured to operate with one or more air interface standards, communication protocols, modulation types, and access types. By way of illustration, the computing device system 400 may be configured to operate in accordance with any of a number of first, second, third, and/or fourth-generation communication protocols and/or the like.

As described above, the computing device system 400 has a user interface that is, like other user interfaces described herein, made up of user output devices 436 and/or user input devices 440. The user output devices 436 include a display 430 (e.g., a liquid crystal display or the like) and a speaker 432 or other audio device, which are operatively coupled to the processor 410.

The user input devices 440, which allow the computing device system 400 to receive data from a user such as the user 110, may include any of a number of devices allowing the computing device system 400 to receive data from the user 110, such as a keypad, keyboard, touch-screen, touchpad, microphone, mouse, joystick, other pointer device, button, soft key, and/or other input device(s). The user interface may also include a camera 480, such as a digital camera.

The computing device system 400 may also include a positioning system device 475 that is configured to be used by a positioning system to determine a location of the computing device system 400. For example, the positioning system device 475 may include a GPS transceiver. In some embodiments, the positioning system device 475 is at least partially made up of the antenna 476, transmitter 474, and receiver 472 described above. For example, in one embodiment, triangulation of cellular signals may be used to identify the approximate or exact geographical location of the computing device system 400. In other embodiments, the positioning system device 475 includes a proximity sensor or transmitter, such as an RFID tag, that can sense or be sensed by devices known to be located proximate a merchant or other location to determine that the computing device system 400 is located proximate these known devices.

The computing device system 400 further includes a power source 415, such as a battery, for powering various circuits and other devices that are used to operate the computing device system 400. Embodiments of the computing device system 400 may also include a clock or other timer 450 configured to determine and, in some cases, communicate actual or relative time to the processor 410 or one or more other devices.

The computing device system 400 also includes a memory 420 operatively coupled to the processor 410. As used herein, memory includes any computer readable medium (as defined herein below) configured to store data, code, or other information. The memory 420 may include volatile memory, such as volatile Random Access Memory (RAM) including a cache area for the temporary storage of data. The memory 420 may also include non-volatile memory, which can be embedded and/or may be removable. The non-volatile memory can additionally or alternatively include an electrically erasable programmable read-only memory (EEPROM), flash memory or the like.

The memory 420 can store any of a number of applications which comprise computer-executable instructions/code executed by the processor 410 to implement the functions of the computing device system 400 and/or one or more of the process/method steps described herein. For example, the memory 420 may include such applications as a conventional web browser application 422, a cryptography based response application 421, entity application 424. These applications also typically instructions to a graphical user interface (GUI) on the display 430 that allows the user 110 to interact with the entity system 200, the cryptography based response system 300, and/or other devices or systems. The memory 420 of the computing device system 400 may comprise a Short Message Service (SMS) application 423 configured to send, receive, and store data, information, communications, alerts, and the like via the wireless telephone network 152. In some embodiments, the cryptography based response application 421 provided by the cryptography based response system 300 allows the user 110 to access the cryptography based response system 300. The cryptography based response application 421 may allow the user 110 to provide inputs associated with the malicious events or view data associated with the malicious events. In some embodiments, the entity application 424 may be provided by the entity system 200. In some embodiments, the cryptography based response application 421 allow the user 110 to access the functionalities provided by the cryptography based response system 300 and the entity system 200.

The memory 420 can also store any of a number of pieces of information, and data, used by the computing device system 400 and the applications and devices that make up the computing device system 400 or are in communication with the computing device system 400 to implement the functions of the computing device system 400 and/or the other systems described herein.

FIG. 5 provides a flowchart illustrating a process flow for providing enhanced cryptography based response mechanism for malicious attacks, in accordance with an embodiment of the invention.

As shown in block 510, the system generates one or more tracker seeds. The one or more tracker seeds may be small files with a few bytes of data, where the one or more tracker seeds are just big enough such that multiple variations of data can be achieved when the data within the small files is encrypted. The one or more tracker seeds generated by the system are as small as possible.

As shown in block 520, the system stores the one or more tracker seeds in at least one entity system associated with an entity. In some embodiments, the one or more tracker seeds may be stored in close proximity to important data within the entity system. In some embodiments, the one or more tracker seeds may be stored within each folder existing in the memory of the entity system. In some embodiments, the system may automatically generate and store the one or more tracker seeds proximate to data based on type of data existing within the at least one entity system. For example, the system may determine that the data is financial information and may determine that the data is important data and may store at least one tracker seed in close proximity to the financial data. In some embodiments, the system may store the one or more tracker seeds in the at least one entity system based on input received from a user, where the user may be an employee of the entity associated with the entity system.

As shown in block 530, the system generates one or more encryption algorithm key pairs for the one or more tracker seeds. One or more keys may generated for each of the available encryption algorithms by the system. The encryption algorithms may include, but are not limited to, Twofish encryption algorithm, Blowfish encryption algorithm, IDEA encryption algorithm, MD5 encryption algorithm, HMAC encryption algorithm, or the like. As shown in block 540, the system encrypts the one or more tracker seeds using each of the one or more encryption algorithm key pairs. The system may encrypt the one or more tracker seeds via different keys generated using each of the encryption algorithms. As shown in block 550, the system stores encrypted tracker seeds for each of the one or more encryption algorithm key pairs and the corresponding one or more encryption algorithm key pairs in one or more rainbow tables.

As shown in block 560, the system identifies a malicious event associated with data in the at least one entity system. In some embodiments, the malicious event may be identified automatically by the system. In some embodiments, the malicious event may be identified based on an input received from a user. The malicious event may be a ransomware attack, where data within the entity system is encrypted by unauthorized users. The data within the entity system which also includes the one or more tracker seeds are also encrypted by the unauthorized user along with other data present within the entity system.

As shown in block 570, the system in response to identifying the malicious event, identifies a match for encrypted data associated with the data after occurrence of the malicious data in the one or more rainbow tables. For example, the system may compare the encrypted data in the one or more tracker seeds placed within the entity system with encrypted tracker seeds stored within the rainbow tables. Upon determining a match, as shown in block 580, the system extracts an encryption algorithm key pair for the malicious event from the one or more encryption algorithm key pairs associated with the match. As shown in block 590, the system decrypts the data in the at least one entity system based on the encryption algorithm key pair. The system automatically finds the encryption algorithm key pair for decrypting the data within the entity system without having to pay the unauthorized user.

In some embodiments, the one or more rainbow tables may be shared with one or more third party systems associated with third party entities. In some embodiments, the system may transmit the one or more rainbow tables directly to the third party systems via secure communication channels. In some embodiments, the system may present the one or more rainbow tables via a user platform, where the user platform is accessed by users of third party entities. The user platform may be a cloud base platform. In some embodiments, the system may share the one or more rainbow tables to a third party entity which may be a security software provider. In some embodiments, the one or more rainbow tables may be transmitted as antivirus signatures to the security software provider, where the security software provider transmits the signatures to one or more other third party entities.

In some embodiments, the system of the present invention comprises an artificial intelligence engine/machine learning model that dynamically generates the one or more rainbow tables based on input received from the third party entities. For example, the system may receive an encryption algorithm key pair from a third party entity which was successful in solving a malicious event and the machine learning module may dynamically update the one or more rainbow tables with new encryption algorithm key pairs that are generated based on the encryption algorithm key pair received from the third party entity. The cryptography based response system 300 allows the one or more third party entities and the entity associated with the present invention to exchange information associated with one or more malicious events and/or one or more rainbow tables via a platform, where the platform may be a cloud based platform.

As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, and the like), or an embodiment combining software and hardware aspects that may generally be referred to herein as a "system." Furthermore, embodiments of the present invention may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present invention may be written in an object oriented, scripted or unscripted programming language such as Java, Perl, Smalltalk, C++, or the like. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational steps to be performed on the computer or other programmable apparatus to produce a computer-implemented process such that the code portions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

The invention claimed is:

1. A system for providing enhanced cryptography based response mechanism for malicious attacks, the system comprising:
    at least one network communication interface;
    at least one non-transitory storage device; and
    at least one processing device coupled to the at least one non-transitory storage device and the at least one network communication interface, wherein the at least one processing device is configured to:
    generate one or more tracker seeds;
    store the one or more tracker seeds in at least one entity system associated with an entity;
    generate one or more encryption algorithm key pairs for the one or more tracker seeds;
    store the one or more encryption algorithm key pairs in one or more rainbow tables;
    identify a malicious event associated with data in the at least one entity system, wherein both the data and the one or more tracker seeds are encrypted by an unauthorized user using a selected encryption algorithm key pair;
    in response to identifying the malicious event, identify a matching encryption algorithm key pair stored in the one or more rainbow tables that matches the selected encryption algorithm key pair used in the malicious event by comparing the one or more tracker seeds that have been encrypted using the one or more encryption algorithm key pairs stored in the one or more rainbow tables with the one or more tracker seeds encrypted in the malicious event;
    extract the matching encryption algorithm key pair from the one or more encryption algorithm key pairs; and
    decrypt the data in the at least one entity system based on the matching encryption algorithm key pair.

2. The system of claim 1, wherein generating the one or more encryption algorithm key pairs further comprises:
    storing the one or more tracker seeds encrypted using each of the one or more encryption algorithm key pairs.

3. The system of claim 1, wherein the at least one processing device is configured to:
    present the one or more rainbow tables to one or more third party entities via a user platform.

4. The system of claim 3, wherein the user platform is a cloud based platform.

5. The system of claim 1, wherein the at least one processing device is configured to:
  modify the one or more rainbow tables based on input received from one or more third party entities.

6. The system of claim 1, wherein the malicious event is a ransomware attack.

7. A computer program product for providing enhanced cryptography based response mechanism for malicious attacks, the computer program product comprising a non-transitory computer-readable storage medium having computer executable instructions for causing a computer processor to perform the steps of:
  generating one or more tracker seeds;
  storing the one or more tracker seeds in at least one entity system associated with an entity;
  generating one or more encryption algorithm key pairs for the one or more tracker seeds;
  storing the one or more encryption algorithm key pairs in one or more rainbow tables;
  identifying a malicious event associated with data in the at least one entity system, wherein both the data and the one or more tracker seeds are encrypted by an unauthorized user using a selected encryption algorithm key pair;
  in response to identifying the malicious event, identifying a matching encryption algorithm key pair stored in the one or more rainbow tables that matches the selected encryption algorithm key pair used in the malicious event by comparing the one or more tracker seeds that have been encrypted using the one or more encryption algorithm key pairs stored in the one or more rainbow tables with the one or more tracker seeds encrypted in the malicious event;
  extracting the matching encryption algorithm key pair from the one or more encryption algorithm key pairs; and
  decrypting the data in the at least one entity system based on the matching encryption algorithm key pair.

8. The computer program product of claim 7, wherein generating the one or more encryption algorithm key pairs further comprises:
  storing the one or more tracker seeds encrypted using each of the one or more encryption algorithm key pairs.

9. The computer program product of claim 7, wherein the computer executable instructions for causing a computer processor to perform the steps of presenting the one or more rainbow tables to one or more third party entities via a user platform.

10. The computer program product of claim 9, wherein the user platform is a cloud based platform.

11. The computer program product of claim 7, wherein the computer executable instructions for causing a computer processor to perform the steps of:
  modifying the one or more rainbow tables based on input received from one or more third party entities.

12. The computer program product of claim 7, wherein the malicious event is a ransomware attack.

13. The computer program product of claim 7, wherein the computer executable instructions for causing a computer processor to perform the steps of transmitting the one or more rainbow tables directly to one or more third party systems via secure communication channels.

14. A computer implemented method for providing enhanced cryptography based response mechanism for malicious attacks, the method comprising:
  generating one or more tracker seeds;
  storing the one or more tracker seeds in at least one entity system associated with an entity;
  generating one or more encryption algorithm key pairs for the one or more tracker seeds;
  storing the one or more encryption algorithm key pairs in one or more rainbow tables;
  identifying a malicious event associated with data in the at least one entity system, wherein both the data and the one or more tracker seeds are encrypted by an unauthorized user using a selected encryption algorithm key pair;
  in response to identifying the malicious event, identifying a matching encryption algorithm key pair stored in the one or more rainbow tables that matches the selected encryption algorithm key pair used in the malicious event by comparing the one or more tracker seeds that have been encrypted using the one or more encryption algorithm key pairs stored in the one or more rainbow tables with the one or more tracker seeds encrypted in the malicious event;
  extracting the matching encryption algorithm key pair from the one or more encryption algorithm key pairs; and
  decrypting the data in the at least one entity system based on the matching encryption algorithm key pair.

15. The computer implemented method of claim 14, wherein generating the one or more encryption algorithm key pairs further comprises:
  storing the one or more tracker seeds encrypted using each of the one or more encryption algorithm key pairs.

16. The computer implemented method of claim 14, wherein the method further comprises presenting the one or more rainbow tables to one or more third party entities via a user platform.

17. The computer implemented method of claim 16, wherein the user platform is a cloud based platform.

18. The computer implemented method of claim 14, wherein the method further comprises modifying the one or more rainbow tables based on input received from one or more third party entities.

19. The computer implemented method of claim 14, wherein the malicious event is a ransomware attack.

20. The computer implemented method of claim 14, wherein the method comprises transmitting the one or more rainbow tables directly to one or more third party systems via secure communication channels.

\* \* \* \* \*